Nov. 22, 1938.　　　　　R. ERICH　　　　　2,137,395

INERTIA SWITCH

Filed July 6, 1936

INVENTOR
R. Erich
BY
ATTORNEY

Patented Nov. 22, 1938

2,137,395

UNITED STATES PATENT OFFICE 2,137,395

INERTIA SWITCH

Reuben Erich, Avenal, Calif.

Application July 6, 1936, Serial No. 89,047

8 Claims. (Cl. 200—52)

This invention relates to inertia switches and particularly to one for use on motor vehicles to give a stop or slow signal by a decelerating change of velocity of the vehicle.

In the design of an inertia switch, experiment has shown that three main problems exist, and that these must be solved if the switch is to be properly efficient.

The most serious difficulty with the ordinary form of inertia switch has been the gravity effect upon the inertia operating unit, which is one problem to be solved. In the second place it is necessary that the inertia operating unit must not only operate under foot-brake slow-down conditions when the unit is mounted on a motor vehicle, but must also have the very important quality of indicating instantly all appreciable velocity changes. In the third place, the switch should dampen the effect of road shock to desired limits when used on a motor vehicle.

Having these factors in mind, it is therefore the main object of my invention to provide an inertia switch of electro-mechanical form, utilizing as essential features a long and a short pendulum which will give efficient service in a motor vehicle under all ordinary operating conditions.

A further object is to construct the switch so that its operation is not affected by the slope or tilt of the vehicle as when on a grade.

This feature of construction also aids in the simplicity of installation of the switch, since it does not have to be leveled up longitudinally of the vehicle.

These objects I accomplish by means of such structure and relative arrangement of parts as will fully appear by a perusal of the following specification and claims.

In the drawing similar characters of reference indicate corresponding parts in the several views.

Figure 1:
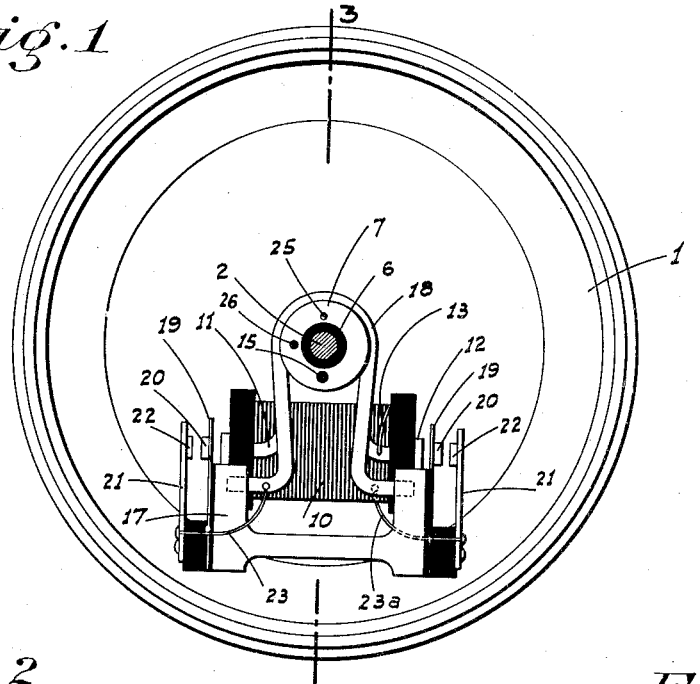
Figure 1 is a side elevation of the switch, with one-half of the enclosing casing removed.
Figure 2:
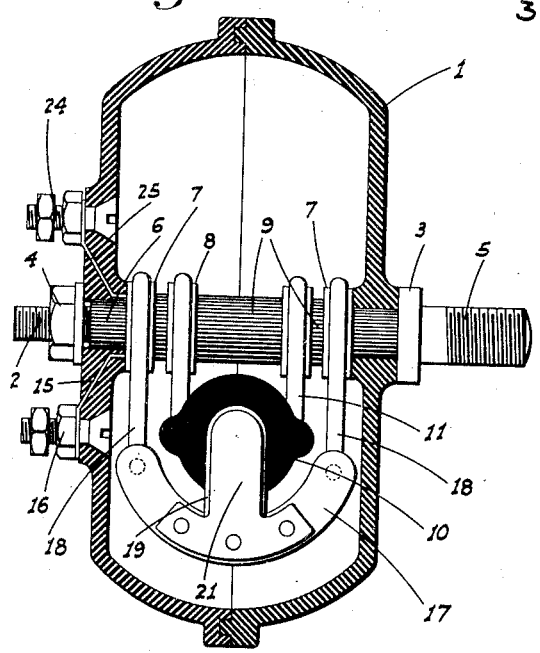
Figure 2 is an end view of the switch, with the casing in section.

Referring now more particularly to the characters of reference on the drawing, the switch comprises a circular casing 1, preferably formed of a pair of circumferentially matching sections removably engaging each other. These sections are releasably clamped together by a central spindle 2 projecting through the casing and having a rigid collar 3 on one end and a clamping nut 4 on the other. Beyond the collar, the spindle is formed with a threaded stud 5 adapted to project through and be secured on a supporting element on the vehicle and so that the spindle extends horizontally and transversely of the vehicle.

Figure 3:
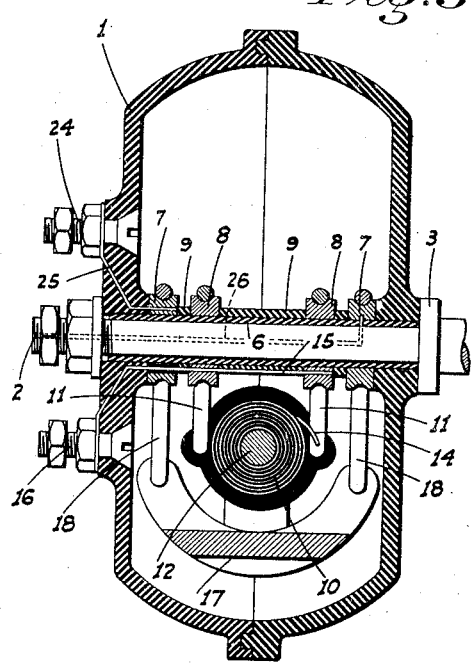
Figure 3 is a transverse section on line 3—3 of Fig. 1.

An insulation sleeve 6 is disposed on the spindle, and disposed on the sleeve adjacent the sides of the casing is a pair of grooved metal discs 7, and another pair of similar discs 8 disposed inwardly of and spaced from the discs 7 as well as from each other. The various discs are held in such spaced relation by insulation spacer rings 9; the rings and discs being clamped against movement by the tightening of the spindle nut 4. Disposed below the spindle with its axis horizontal and at right angles to the spindle (or so that said axis extends longitudinally of a motor vehicle when the spindle is secured thereon) is an electro-magnet 10, supported from its insulated end-pieces on opposite sides thereof by metal stirrups 11 which freely and turnably engage the inner discs 8. The magnet is double wound so that both ends of its core 12 will be similarly energized; one winding being connected to the core at one end and to one stirrup, as indicated at 13 and the other winding being connected to the core adjacent the other end and to the other stirrup as indicated at 14. A current supply lead 15 contacts the two discs 8 while avoiding contact with discs 7 (as shown in Fig. 3) and extends to a connection with a binding post 16 on one side of the casing and to which a current supply wire may be connected.

The electro-magnet being freely suspended from its supporting discs, and being relatively heavy, forms a pendulum which is responsive to every velocity change. This magnet is the short pendulum of the unit.

The other and longer pendulum of the unit is in the form of a cradle 17 disposed below and in symmetrical relationship to the electro-magnet. This cradle is suspended adjacent its ends and on opposite sides of the magnet by metal stirrups 18 freely and turnably engaging the discs 7.

The pendulums being thus co-axial, always maintain the same relationship to each other irrespective of relative turning of the fixed spindle due to any change of slope of the vehicle.

Blade springs 19 of suitable resiliency are secured on and project upwardly from the cradle beyond the ends of and overlap the magnet core 12; said springs having contacts 20 on their faces opposite said core and in substantial horizontal alinement therewith. Upstanding armature plates 21 are mounted on the cradle beyond and in alinement with the springs in insulated relation thereto; the plates having contacts 22 on the faces thereof adjacent and in cooperative relationship with the contacts 20.

One plate 21 is electrically connected to one of the stirrups 18 by wire 23, and the other plate 21 is similarly connected to the other stirrup 18 by wire 23a. The disc 7 of the one stirrup 18 is connected to a binding post 24 on the casing by wire 25. The disc 7 of the other stirrup is connected by wire 26 to another binding post, which for convenience may be on the outer end of spindle 2, as indicated in Fig. 3. By reason of this arrangement, one circuit will be closed when the pendulums swing forwardly with the slowing down of the vehicle, and another circuit will be closed when the pendulums swing rearwardly with the acceleration of the vehicle. With suitable signals interposed in these circuits, both decelerating and accelerating signals as the case may be will be given to the driver of a car behind.

The switch, constructed as above described, operates on the well-known principle of the difference in vibratory rate of the pendulums, that a shorter pendulum will swing out more rapidly than a longer one. This being the case, as long as the vehicle is moving with uniform velocity, the pendulums will assume a downwardly vertical and parallel position to each other. Now when the vehicle slows down, both pendulums will swing, but the short electro-magnet pendulum will swing faster than the long cradle pendulum.

As a result, the electro-magnet core at one end will first engage and deflect the corresponding spring 19, which in turn will engage the adjacent armature contact. The circuit will then obviously be closed, so that not only will a signal in the circuit be operated, but the electro-magnet will be energized, and the armature plate will be magnetically held against the adjacent spring, and the latter against the magnet core. With any further swing of the pendulums and with a uniform rate of deceleration, therefore they will move together in what may be considered an integral relationship until the inertia force is removed.

The signal will then continue to be given until the vehicle comes to an actual stop, or its velocity is increased.

The circuit then automatically breaks due to the action of a certain fundamental law of nature; which may be stated as the resistance to a change of motion. The action of this law may be observed by performing various physical experiments, which will show that an object will start in motion, with a decided jerk or kick, which will also be noticeable at the instant of actual stopping. This phenomenon I call an inertia kick.

Therefore, to break the circuit, we find that the same condition which originally caused the circuit to be closed will now break it. In other words, when the inertia force has dropped to zero, the pendulums will swing back toward their normal vertical position, and the difference in vibratory rate characteristic of the pendulums will cause the smaller one to swing more rapidly toward such position than the longer one, which will in itself tend to break the circuit, and may be sufficient to do so.

However, unless the slow-down movement is extremely gradual it will be found that the pendulums will swing past a vertical position somewhat. It is at this point that the "inertia kick" becomes effective to break the circuit if the difference in vibratory rate has not already done so. This is because the inertia kick will have a greater effect on the short pendulum than on the long one, due also to the vibratory difference, and thus giving a jerking apart action to the pendulums.

Likewise, if the pendulums are disposed in the out-of-vertical position during deceleration, an increase in velocity will at the start cause both the inertia kick and the difference in vibratory rate to affect the pendulums, resulting in the desired breaking of the circuit. In the extreme case of an initial inertia impulse causing the circuit to close—a phenomenon which always occurs at any change of velocity and more particularly causes the short pendulum to kick out from its natural vertically downward position, (although the long pendulum also moves at a slower rate)—if the motion is uniform and the speed of the vehicle levels off at a very gradual rate, the pendulums approach a vertically downward position in an integral relationship and in contact. In this case, at the instant the inertia force is removed, as when the vehicle comes to rest or again assumes a uniform velocity, three factors contribute to the breaking of the circuit. These factors are: 1. A small inertia kick. 2. The resistance of the spring 19. 3. A small gravity component force. The pendulums constituting the switch will therefore swing and conform to inertia laws whenever velocity changes occur in the vehicle or other object on which the switch is mounted.

The spring blades 19 are for the purpose of preventing closing of the circuit which might be caused by vibration of the pendulums due to road shocks, since they maintain the pendulums yieldably separated, and also act to prevent magnetic sticking.

The magnet being double ended and having corresponding contacts at both ends, makes the switch serviceable for giving backing up signals as well as acceleration, as previously stated.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An inertia switch comprising relatively long and short pendulums normally spaced apart, switch contact elements adapted to cooperate to close the switch circuit, means mounting the pendulums for swinging movement in a common direction and in such relationship to each other and to the contact elements that the latter will thus cooperate by reason of and after a predetermined amount of swinging movement of the pendulums from a normal vertical position, and means acting to prevent engagement of the contacts with vibratory movement of the pendulum mounting means and the consequent vibrations imparted to the pendulums.

2. An inertia switch comprising a spindle, means to mount the spindle in a relatively fixed horizontal position transversely of the direction of an inertia force, a pendulum below said spindle in the form of an electro-magnet whose axis normally extends horizontally and at right angles to the spindle, one end of the core of the magnet forming a contact, means swingably suspending said pendulum from the spindle, another pendulum directly below said first pendulum, means swingably suspending said other pendulum from the spindle for swinging movement independently of the first pendulum, a contact on said other pendulum beyond but in position to cooperate with the said end of the electromagnet core with a swinging movement of the first pendulum relative to the second pendulum, and circuit means in which said contact and the electro-magnet are interposed.

3. A switch as in claim 2, with a spring blade mounted on said other pendulum and projecting between the magnet core and the contact of the other pendulum in normally spaced relation thereto; the contact of said other pendulum being insulated from the blade.

4. An inertia switch comprising a spindle, means to mount the spindle in a relatively fixed horizontal position transversely of the direction of an inertia force, a pendulum below said spindle in the form of an electro-magnet whose axis normally extends horizontally and at right angles to the spindle, one end of the core of the magnet forming a contact, spaced current conducting discs fixed on the spindle, current conducting stirrups turnable on the discs and supporting the electro-magnet adjacent its ends, an electrical connection between one stirrup and the winding of the magnet, a conducting element leading from the corresponding disc, another pendulum directly below the first pendulum, other current conducting discs on the spindle, current conducting stirrups turnable on said other discs and supporting said other pendulum, means maintaining the discs of the two pendulums insulated from each other, a contact member mounted on said other pendulum and projecting upwardly to a termination in facing relation to said end of the magnet core and normally spaced therefrom, an electrical connection between said contact and one of the stirrups of said other pendulum, and a conducting element leading from the corresponding disc.

5. A structure as in claim 4, with a spring blade mounted on said other pendulum in insulated relation to the contact member and projecting upwardly to a termination between and in substantial alinement with but normally spaced from the end of the magnet core and said contact member.

6. An inertia switch comprising relatively long and short pendulums normally spaced apart, means mounting the pendulums for swinging movement in a common direction, switch contact elements adapted to cooperate in circuit closing relationship after and by reason of a predetermined amount of swinging movement of the pendulums from a normal vertical position, a circuit closed upon such cooperation of the contact elements, and means forming a part of one pendulum and included in the circuit to cause the contact elements, when once the circuit is closed, to remain in cooperative relationship until the inertia force acting on the pendulums is removed.

7. An inertia switch comprising relatively long and short pendulums normally spaced apart, means mounting the pendulums for swinging movement in a common direction, switch contact elements adapted to cooperate in circuit closing relation after and by reason of a predetermined amount of swinging movement of the pendulums from a normal vertical position, a circuit closed upon such cooperation of the contact elements, and electro-magnetic means forming a part of one pendulum and included in the circuit to cause the contact elements, when once the circuit is closed, to remain in cooperative relationship until the inertia force acting on the pendulums is removed.

8. An inertia switch comprising relatively long and short pendulums normally spaced apart, means mounting the pendulums for swinging movement in a common direction, switch contact elements adapted to cooperate in circuit closing relation after and by reason of a predetermined amount of swinging movement of the pendulums from a normal vertical position, the major bulk of one of said pendulums consisting of an electro-magnet the core of which forms the contact element of said pendulum, and a circuit in which said pendulum is interposed and in which the contact element of the other pendulum is connected.

REUBEN ERICH.